June 25, 1946.                J. R. RICKETTS                2,402,775
              DEVICE FOR FACING THE SLIDE VALVE SEAT OF A TRIPLE VALVE
                              Filed Sept. 30, 1944
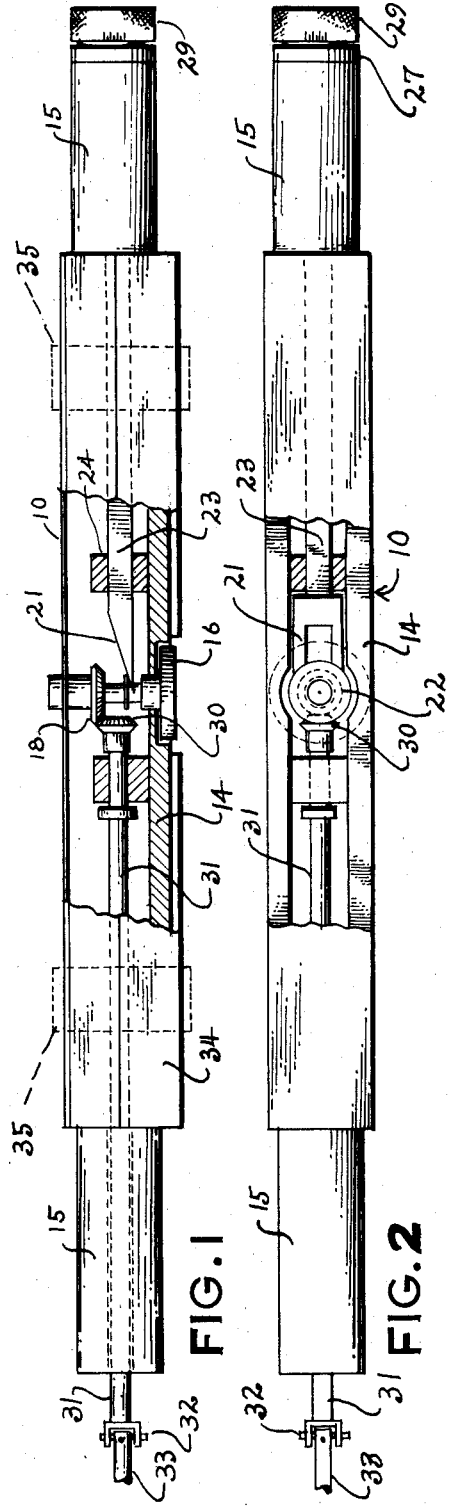
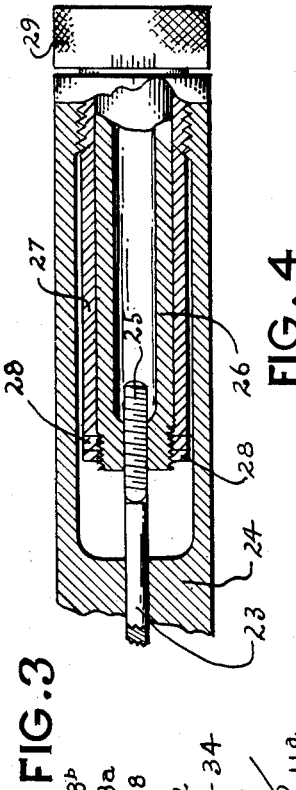
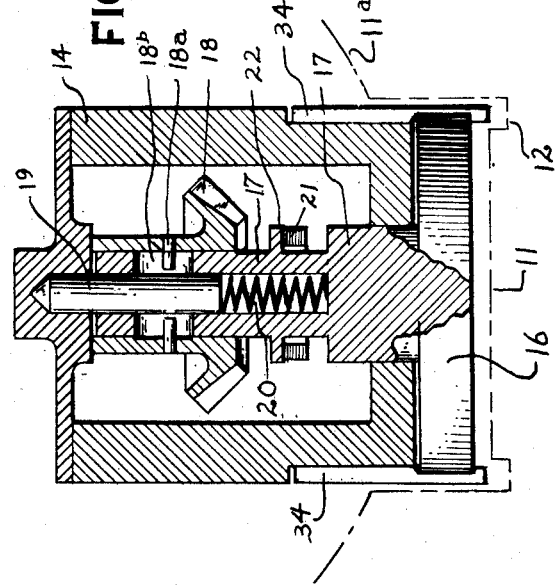
INVENTOR.
JAMES R. RICKETTS
BY
Oscar A. Mellin
Attorney Patented June 25, 1946

2,402,775

UNITED STATES PATENT OFFICE 2,402,775

DEVICE FOR FACING THE SLIDE VALVE
SEATS OF TRIPLE VALVES

James R. Ricketts, Berkeley, Calif.

Application September 30, 1944, Serial No. 556,601

4 Claims. (Cl. 51—170)

This invention relates to machine tools and particularly pertains to a device for facing the slide valve seat of a triple valve.

The slide valve seat of a triple valve wears unevenly causing leakage and occasionally requires that the slide valve seat to be re-surfaced. Heretofore, various methods and machines have been devised for re-facing such seats. However, the re-facing operations by these prior methods and machines have been slow and costly and have required the services of a highly skilled mechanic, and on the whole have not been entirely satisfactory.

It is the principal object of my present invention to provide an improved device which is comparatively simple and inexpensive in construction, but which can be utilized to expeditiously and effectively re-face the slide valve seat of a triple valve, which device does not require for operation the services of a highly skilled technician.

One form which the invention may assume is exemplified in the following description and illustrated by way of example in the accompanying drawing, in which:

Fig. 1 is a side elevation of a machine or tool embodying the preferred form of my invention with parts thereof broken away and in section to more fully disclose certain features of construction.

Fig. 2 is a plan view thereof with parts broken away and in section to show certain features of construction.

Fig. 3 is an enlarged transverse sectional view taken on line 3—3 of Fig. 1.

Fig. 4 is an enlarged fragmentary view of one handle end of the device and shown in section disclosing the method of adjusting the feed of the rotary tool carried by the device.

Referring more particularly to the accompanying drawing, 10 indicates a machine or device for surfacing or facing the valve seat of a triple valve. This slide valve seat is indicated by broken lines at 11 in Fig. 3 and the bore of the triple valve is indicated by broken lines at 11a in Fig. 3.

As is well known, the slide valve seat of a triple valve is of a uniform width and is substantially rectangular and extends throughout the entire length of the bore of the triple valve body. In re-surfacing, of course, the ends of this bore are open. It is essential for proper operation of the valve that the entire surface of the slide valve seat lie in the same plane.

In constructing a triple valve broached grooves 12 are formed at the side marginal edges of the valve seat and the bottoms of these grooves lie in a plane exactly parallel to the correct plane of the valve seat 11. When the slide valve seat 11 wears, it wears unevenly, usually being low in the center and high at the ends, and when it so wears, it necessitates that the seat be re-surfaced or refaced to place the entire area of its surface on the same plane.

In the operation of the device 10, I utilize the grooves 12 as a medium of guiding the machine or device 10. The machine 10 comprises an elongated rigid frame or body 14 of a width approximately that of the slide valve seat 11 and of a length considerably greater than the length of the triple valve body. The ends of the frame 14 are turned to form handles 15. This is so that the device 10 may be projected through the bore 11a of the triple valve with the ends projecting a considerable distance beyond the ends of that valve so that the handles 15 may be grasped by an operator and the device 10 reciprocated longitudinally of the seat 11 to feed a re-surfacing or re-facing tool 16 thereover.

The tool 16 is circular and may be a grinding, lapping or cutting tool, and in operation of the device 10, the tool 16 is revolved to effect the resurfacing or re-facing. As is illustrated in Fig. 3, the tool 16 is of a diameter just slightly greater than the width of the slide valve seat 11, and it is mounted flatwise at the underside of the frame 14 with its axis centrally between the sides of the frame and centrally between the ends thereof. The tool 16 is secured in any suitable fashion on a sleeve 17 which extends upwardly into the frame 14 and suitably journaled therein. Non-rotatable but axially movable on this sleeve is a bevel gear 18 which provides a driving medium for the sleeve 17 and consequently the tool 16. A bearing pin 19 and a spring 20 provide a meduim constantly tending to yieldably urge the tool 16 into cutting or grinding contact with the valve seat.

It is necessary, however, that the outward or feeding travel of the tool 16 toward the work be limited, as will be apparent to those skilled in the art. I accomplish this by means of a bifurcated wedge 21 which engages the underside of a collar 22 fixed on the sleeve 17. Obviously, by reference to Figs. 1 and 3, adjustment of this wedge toward and away from the axial center of the sleeve 17 will regulate the amount of axial movement in an outward direction of the tool 16. The wedge 21 is fixed on a square adjuster rod 23 which 2,402,775

3 extends longitudinally and centrally of the frame 14 toward one handle 15.

The adjuster rod 23 is guided in guides 24 in the frame so that it may reciprocate but cannot rotate. At its outer end the adjuster rod 23 is turned and threaded as at 25 and is threaded into a feed nut 26 rotatably mounted in a bushing 27 fixed in the handle 15. The feed nut 26 is collared against endwise movement by fixed collars 28 at its inner end and a fixed knob 29 at its outer end. Consequently, by turning the knob 29, the feed nut 26 will be rotated causing axial movement of the adjuster rod 23 in a direction depending upon the direction of turning movement of the knob 29. The knob 29 may be calibrated, as illustrated, so that the operator can determine the amount of endwise movement imparted to the rod 23 and consequently the amount of axial movement permitted the tool 16 toward the work.

From the above description it is obvious that the sleeve 17 carrying the tool 16 may move axially independently of the gear 18, but it is at all times in driving relationship thereto. This is due to the fact that key pins 18a are fixed in the hub of the gear 18 and engage slots 18b formed in the sleeve 17. This arrangement obviously permits a limited amount of relative movement of the sleeve 17 with respect to the gear 18 without disturbing the driving connection therebetween.

To drive the gear 18 and consequently the cutter 16 through the sleeve 17, a drive pinion 30 is in mesh with the gear 18. This pinion 30 is fixed on a drive shaft 31 which extends longitudinally and centrally through the adjacent end of the frame 14 and through the handle 15 thereof. This drive shaft 31 is suitably journaled in the frame 14, as illustrated. At the outer end of the drive shaft 31 it is fitted with a universal joint or coupling 32 by means of which it may be connected to a flexible shaft 33, which in turn may be connected to a source of driving power, such as a motor or other prime mover.

In order to properly feed the tool 16 along the slide valve seat 11 to re-surface the same so that its entire surface will lie in a correct plane, elongated guide members 34 are fixed at each side of the frame 14 and project below the same and below the tool 16, as illustrated. The spacing of these guide members is such that they will engage the bottoms of the grooves 12 at the sides of the valve seat 11, and by such engagement will enable the entire device 10 to be reciprocated in a plane exactly parallel to the correct plane of the valve seat 11.

In operation of the device, it is constructed and assembled as shown in the drawing. The operator then determines the low spot in the valve seat and adjusts the outward limit of the cutting tool 16 to that point. The device 10 is then projected through the bore of the triple valve body with the guides 34 engaged with the grooves 12. The power is then turned on to drive the tool 16, and the operator reciprocates the entire device through the bore of the triple valve, maintaining the guides 34 in engagement with the bottoms of the grooves 12. During this time the spring 20 will yieldably urge the tool 16 into cutting engagement with the seat, and as the device is reciprocated, the re-surfacing or re-facing will be effected. In so doing, it is necessary that the operator reciprocate the tool an amount that the center of the tool will move

4 from one end of the slide valve seat to the other end. It is essential that this precise stroke be maintained; that is, one end of the stroke will be when the center of the tool 16 is at one end of the slide valve seat and the other end of the stroke will be when that center reaches the other end of the slide valve seat.

For this purpose it may be desired to provide adjustable stops 35 on the frame 14. Obviously, such stops may be adjusted to the exact length of the slide valve seat, and when secured on the frame 14, they will allow the operator to reciprocate the device 10 so that the stops alternately engage the ends of the triple valve body. As the stops form no part of my present invention, they are not illustrated in detail as it is believed that the provision thereof would be obvious to any one skilled in the art.

It is seen that after the high spots of the seat are removed, the operator may, if desired, continue re-facing the seat by adjustment of the knob 29 which will result in further feeding of the tool 16. The amount of the additional cut may be determined by the operator through the calibrations on the knob 29.

From the foregoing it is obvious that I have provided a very simple and efficient device for re-surfacing the face of the slide valve seat in a triple valve. Also, it is manifest that the device can be employed for expeditiously and efficiently re-surfacing such a seat and that it can be operated to accomplish such purpose without the services of a highly skilled technician.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A device of the character described comprising an elongated frame adapted to be projected through a triple valve body, fixed guide means at opposite sides of the frame adapted to ride in and engage the grooves at opposite sides of the slide valve seat of the triple valve body whereby the frame may be guided thereby for reciprocation through the body in a fixed path relative to the slide valve seat, a rotary tool carried by the frame at the side thereof to have its flat outer face engage the slide valve seat when said guides are engaged with said grooves, means carried by the frame for imparting a rotary drive to said tool as the frame is reciprocated through the body to enable said tool to operate on said slide valve seat throughout its entire length.

2. A device of the character described comprising an elongated frame adapted to be projected through a triple valve body, fixed guide means at opposite sides of the frame adapted to ride in and engage the grooves at opposite sides of the slide valve seat of the triple valve body whereby the frame may be guided thereby for reciprocation through the body in a fixed path relative to the slide valve seat, a rotary tool carried by the frame at the side thereof to have its flat outer face engage the slide valve seat when said guides are engaged with said grooves, means for yieldably urging the face of said tool into operative engagement with said slide valve seat, means carried by the frame for imparting a rotary drive to said tool as the frame is reciprocated through the body to enable said tool to operate on said slide valve seat throughout its entire length.

3. A device of the character described comprising an elongated frame adapted to be projected through a triple valve body, fixed guide means at opposite sides of the frame adapted to ride in and engage the grooves at opposite sides of the slide valve seat of the triple valve body whereby the frame may be guided thereby for reciprocation through the body in a fixed path relative to the slide valve seat, a rotary tool carried by the frame at the side thereof to have its flat outer face engage the slide valve seat when said guides are engaged with said grooves, means for yieldably urging said tool into operative engagement with said seat, means for limiting the movement of said tool in the direction of the seat, means carried by the frame for imparting a rotary drive to said tool as the frame is reciprocated through the body to enable said tool to operate on said slide valve seat throughout its entire length.

4. A device of the character described comprising an elongated frame adapted to be projected through a triple valve body, fixed guide means at opposite sides of the frame adapted to ride in and engage the grooves at opposite sides of the slide valve seat of the triple valve body whereby the frame may be guided thereby for reciprocation through the body in a fixed path relative to the slide valve seat, a rotary tool carried by the frame at the side thereof to have its flat outer face engage the slide valve seat when said guides are engaged with said grooves, means for yieldably urging said tool in the direction of said seat so that it will yieldably and operatively engage said seat, means carried by the frame for adjusting the amount of movement permitted said tool in the direction toward said seat, means carried by the frame for imparting a rotary drive to said tool as the frame is reciprocated through the body to enable said tool to operate on said slide valve seat throughout its entire length.

JAMES R. RICKETTS.